US012809614B2

(12) United States Patent
Tsai et al.

(10) Patent No.: US 12,809,614 B2
(45) Date of Patent: Nov. 24, 2026

(54) ELECTRONIC DEVICE AND METHOD FOR UPDATING FIRMWARE

(71) Applicant: PEGATRON CORPORATION, Taipei City (TW)

(72) Inventors: Deelun Tsai, Taipei City (TW); Guan Hung Lin, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 279 days.

(21) Appl. No.: 18/639,962

(22) Filed: Apr. 19, 2024

(65) Prior Publication Data

US 2025/0094157 A1 Mar. 20, 2025

(30) Foreign Application Priority Data

Sep. 18, 2023 (TW) ................................ 112135543

(51) Int. Cl.
*G06F 8/65* (2018.01)

(52) U.S. Cl.
CPC ...................................... *G06F 8/65* (2013.01)

(58) Field of Classification Search
CPC ........................................................ G06F 8/65
See application file for complete search history.

(56) References Cited

U.S. PATENT DOCUMENTS

| | | | | |
|---|---|---|---|---|
| 7,676,562 B2 * | 3/2010 | Reistad | ............... | H04L 43/0817 709/224 |
| 10,038,518 B1 * | 7/2018 | Sun | ..................... | H04L 27/2603 |
| 11,249,974 B1 * | 2/2022 | Fuchs | ................. | G06F 16/2255 |
| 2013/0061252 A1 * | 3/2013 | Bernbo | ................. | G06F 16/182 707/E17.005 |
| 2020/0320223 A1 * | 10/2020 | Narayanan | .......... | G06F 21/6254 |
| 2022/0060351 A1 * | 2/2022 | Grzegorczyk | .......... | H04L 12/40 |

FOREIGN PATENT DOCUMENTS

| | | | |
|---|---|---|---|
| CN | 106598632 | 4/2017 | |
| CN | 106598632 A * | 4/2017 | ......... G06F 9/44536 |
| CN | 109840107 | 6/2019 | |
| CN | 109840107 A * | 6/2019 | |
| CN | 112130885 | 12/2020 | |
| CN | 112130885 A * | 12/2020 | ......... G06F 9/44505 |
| CN | 114185571 | 3/2022 | |
| CN | 116594803 | 8/2023 | |

* cited by examiner

*Primary Examiner* — Qing Chen
*Assistant Examiner* — Feven H Huruy
(74) *Attorney, Agent, or Firm* — J.C. PATENTS

(57) ABSTRACT

An electronic device and a method for updating a firmware are disclosed. The method includes: receiving a firmware updating file through a communication interface, where the firmware updating file includes boot data; detecting a first field of the firmware updating file to determine whether the firmware updating file supports a first format; in response to the firmware updating file supporting the first format, detecting a second field of the firmware updating file to obtain an identifier; and transmitting the boot data to a firmware component corresponding to the identifier through the communication interface to update the firmware component.

16 Claims, 5 Drawing Sheets

ELECTRONIC DEVICE AND METHOD FOR UPDATING FIRMWARE

CROSS-REFERENCE TO RELATED APPLICATION

This application claims the priority benefit of Taiwan application serial no. 112135543, filed on Sep. 18, 2023. The entirety of the above-mentioned patent application is hereby incorporated by reference herein and made a part of this specification.

BACKGROUND

Technical Field

This disclosure relates to an electronic device and a method, and in particular to an electronic device and a method for updating firmware.

Description of Related Art

Existing firmware updating file in hardware platform management (HPM) format may include a byte that indicates the firmware component to which the firmware updating file applies, where the byte may be used to indicate up to eight different firmware components. However, the existing firmware updating file format is not suitable for situations where the number of firmware components exceeds eight. Normal firmware updating file format interpreters (e.g., ipmitool) do not accurately interpret firmware updating files to determine the firmware components to which the firmware updating file applies. In addition, different developers design different ways of updating firmware components. In cases where the format of the firmware updating file is not fixed, the firmware updating file may not be compatible with the instruction set used to update the firmware component.

SUMMARY

The disclosure provides an electronic device and a method for updating a firmware, applicable when a quantity of firmware components is large.

The electronic device of the disclosure for updating a firmware including a processor, a storage medium, and a communication interface. The communication interface receives a firmware updating file, in which the firmware updating file includes boot data. The storage media stores multiple modules. The processor is coupled to the storage medium and the communication interface, and is adapted to access and execute multiple modules. The modules include a first application programming interface and a second application programming interface. The first application programming interface is adapted to detect a first field of the firmware updating file to determine whether the firmware updating file supports a first format. In response to the firmware updating file supporting the first format, the second application programming interface detects a second field to obtain an identifier. After obtaining the identifier, the second application programming interface transmits the boot data to a firmware component corresponding to the identifier through the communication interface to update the firmware component.

In an embodiment of the disclosure, the firmware updating file further includes a first header, and the first header includes the first field and the second field.

In an embodiment of the disclosure, in response to the firmware updating file not supporting the first format, the first application programming interface obtains the identifier from the first field. After obtaining the identifier, the first application programming interface transmits the boot data to the firmware component corresponding to the identifier through the communication interface to update the firmware component.

In an embodiment of the disclosure, the firmware updating file further includes a second header, and the second header includes the first field.

In an embodiment of the disclosure, a format of the firmware updating file includes a hardware platform management (HPM) format, and the second header corresponds to an action header in the hardware platform management format In an embodiment of the disclosure, the firmware updating file further includes a third header. The first application programming interface detects a third field in the third header to determine whether the firmware updating file supports a second format. In response to the firmware updating file supporting the second format, the first application programming interface detects the first field to determine whether the firmware updating file supports the first format.

In an embodiment of the disclosure, a format of the firmware updating file includes a hardware platform management (HPM) format, and the third header corresponds to a hardware platform management header in the hardware platform management format.

In an embodiment of the disclosure, a format of the firmware updating file includes a hardware platform management (HPM) format, the first field corresponds to a component field in the hardware platform management format, the first field includes a reserved bit, and the first application programming interface determines whether the firmware updating file supports the first format according to the reserved bit.

In an embodiment of the disclosure, the second application programming interface obtains the identifier according to a byte in the second field.

In an embodiment of the disclosure, the communication interface supports at least one of a serial peripheral interface and an integrated bus circuit.

The method for updating a firmware of the disclosure includes the following. A firmware updating file is received through a communication interface, in which the firmware updating file includes boot data. A first field of the firmware updating file is detected to determine whether the firmware updating file supports a first format. In response to the firmware updating file supporting the first format, a second field is detected to obtain an identifier. The boot data is transmitted to a firmware component corresponding to the identifier through the communication interface to update the firmware component.

In an embodiment of the disclosure, the method for updating a firmware further includes the following. In response to the firmware updating file not supporting the first format, the identifier is obtained from the first field.

Based on the above, the electronic device of the disclosure may determine whether the firmware updating file supports the first format according to the first field of the firmware updating file, and detects the second field and obtains the identifier according to the second field when the firmware updating file supports the first format. In this way, more than 8 types of firmware components may be indicated to select the firmware component to which the firmware updating file applies, and thus the firmware component is updated according to the firmware updating file.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
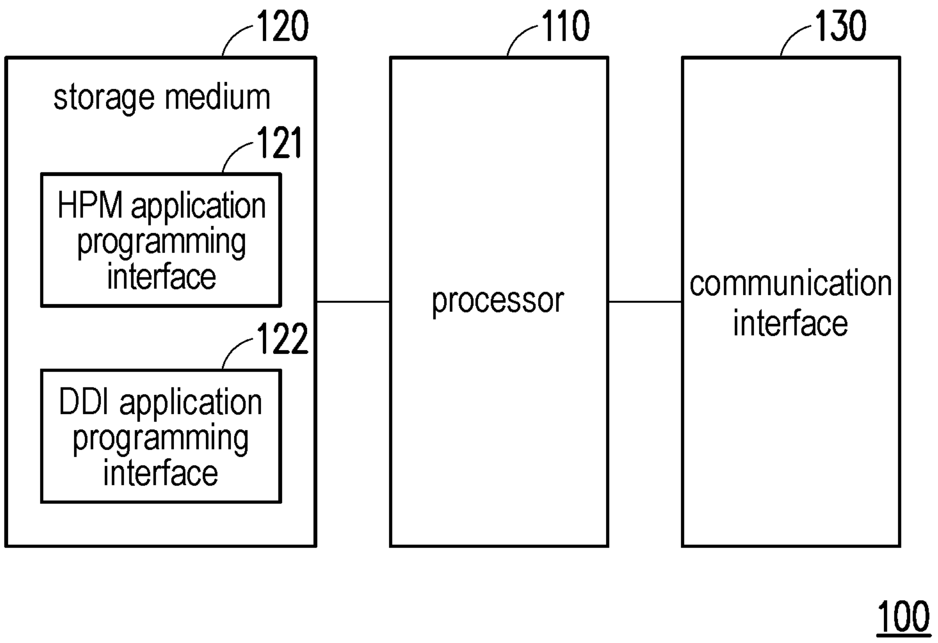
FIG. 1 illustrates a schematic diagram of an electronic device for updating firmware according to an embodiment of the disclosure.

FIG. 1 illustrates a schematic diagram of an electronic device 100 for updating firmware according to an embodiment of the disclosure. The electronic device 100 may include a processor 110, a storage medium 120, and a communication interface 130.

The processor 110 is, for example, a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP)), image processing unit (IPU), arithmetic logic unit (ALU), complex programmable logic device (CPLD), field programmable gate array (FPGA), or other similar components or a combination of the above components. The processor 110 may be coupled to the storage medium 120 and the communication interface 130, and access and execute multiple modules and various application programs stored in the storage medium 120.

The storage medium 120 is, for example, any type of static or dynamic random access memory (RAM), read-only memory (ROM), flash memory, hard disk drive (HDD), solid state drive (SSD), or similar components or a combination of the above components, configured to store multiple modules or various application programs that may be executed by the processor 110. In this embodiment, the storage medium 120 may store multiple modules including a hardware platform management (HPM) application programming interface (API) 121 and a dynamic detect image (DDI) application programming interface 122, the functions of which will be described later.

The communication interface 130 transmits or receives signals in a wireless or wired manner. The communication interface 130 may support communication protocols such as serial peripheral interface (SPI) or inter-integrated circuit (I2C). The electronic device 100 may communicate with an external device (e.g., a read-only memory configured to store firmware components in a hardware apparatus) through the communication interface 130.

Figure 2A:
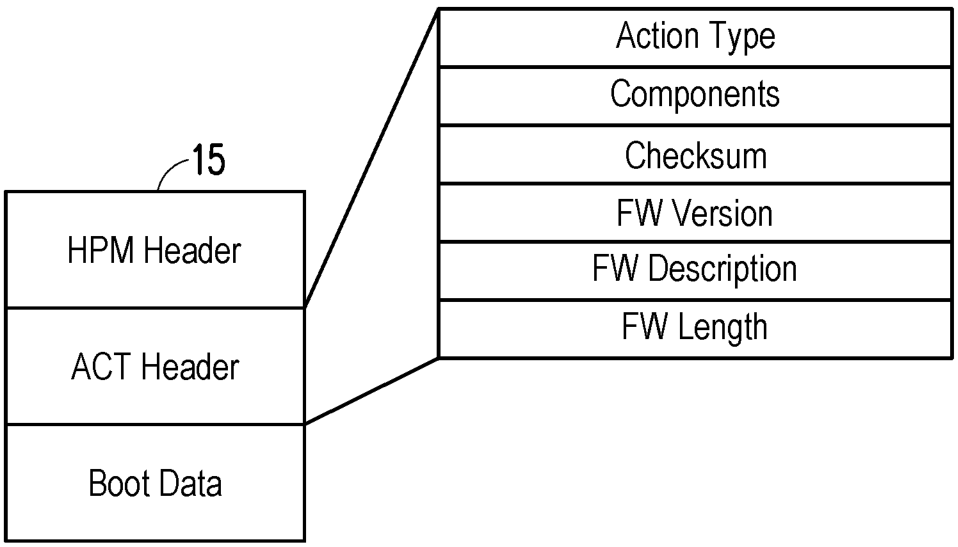
FIG. 2A and FIG. 2B illustrate schematic diagrams of two formats of firmware updating files according to an embodiment of the disclosure.
Figure 2B:
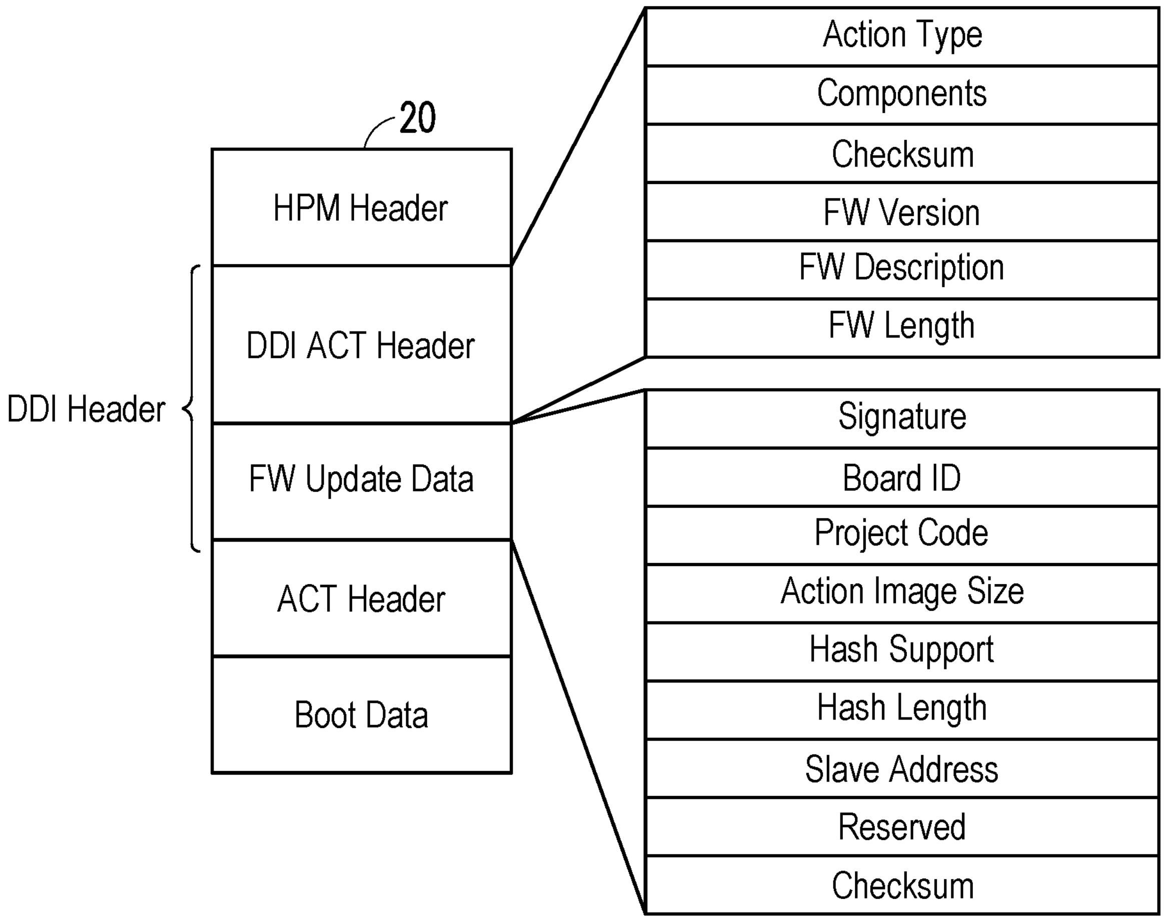

The electronic device 100 may be configured to parse a firmware updating file and determine which firmware component the firmware updating file is applicable to. FIG. 2A and FIG. 2B illustrate schematic diagrams of a format 15 and a format 20 of firmware updating files according to an embodiment of the disclosure. The format 15 shown in FIG. 2A may be a hardware platform management (HPM) format. Specifically, the format 15 may include an HPM header, an action header (ACT header), and boot data. The format 20 may be a format that supporting and compatible with the hardware management platform format. Specifically, the format 20 may include a HPM header, an ACT header, and boot data. In addition, the format 20 may further include a DDI header. The DDI header may include a DDI action header (DDI ACT header) and firmware updating data (FW update data), and the DDI action header and the firmware updating data include a component field and a board identifier (board ID) field respectively. In other words, compared to the traditional HPM format, the format 20 further has a DDI header.

Figure 3:
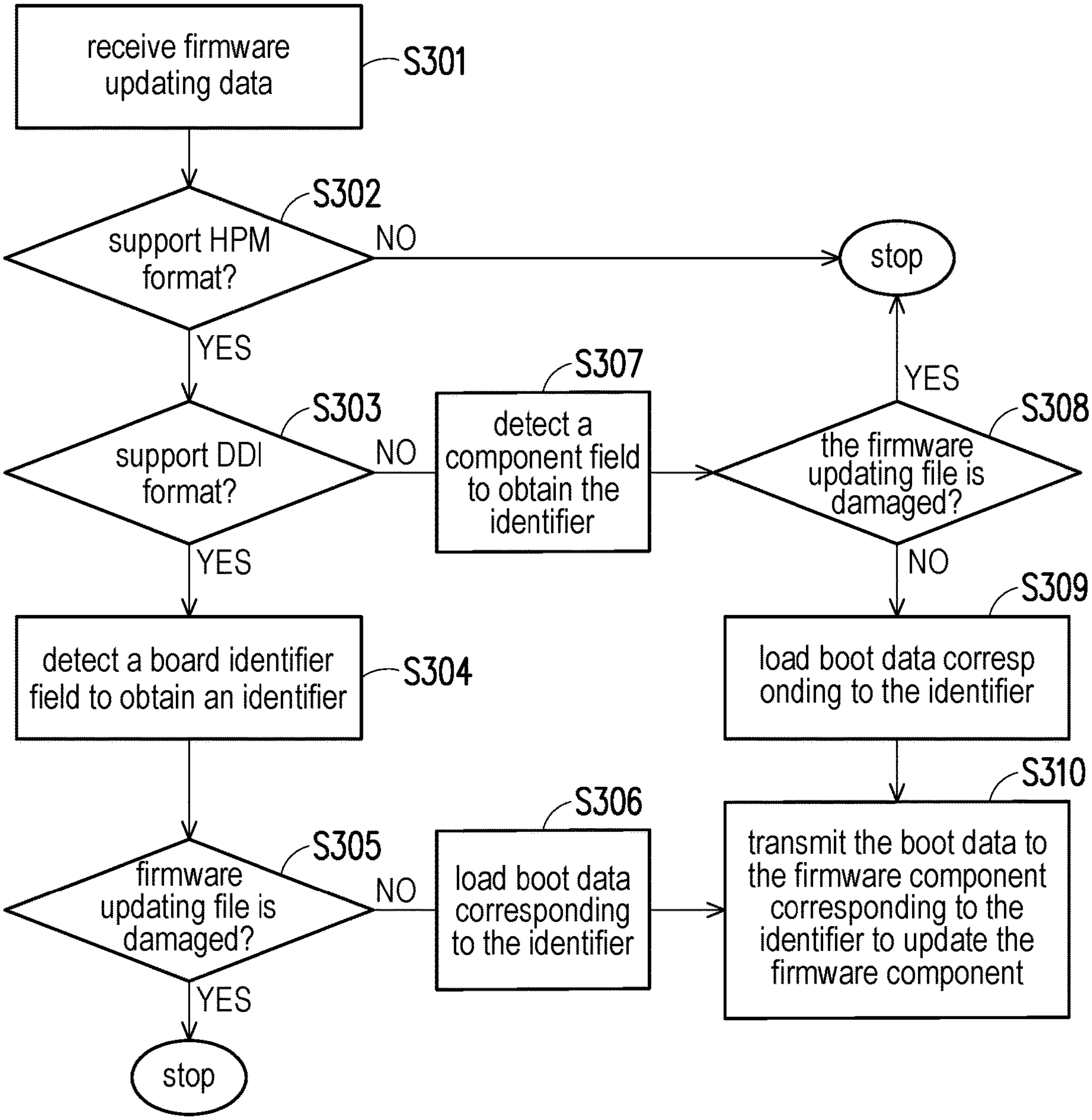
FIG. 3 illustrates a flow chart of a method for updating firmware according to an embodiment of the disclosure.

FIG. 3 illustrates a flow chart of a method for updating firmware according to an embodiment of the disclosure, in which the method may be implemented by the electronic device 100 shown in FIG. 1. In step S301, the processor 110 may receive the firmware updating data through the communication interface 130.

In step S302, the HPM API 121 (or first API) detects a signature field (or third field) in the HPM header (or third header) in the firmware updating data to determine whether the firmware updating file supports the HPM format (or second format). If the signature field in the HPM header indicates that the firmware updating file supports the HPM format, proceed to step S303. If the signature field in the HPM header indicates that the firmware updating file does not support the HPM format, or the firmware updating data does not include the HPM header, the firmware update failed. The processor 110 may stop the firmware update process.

In step S303, the HPM API 121 may detect the component field (or first field) in the firmware updating data to determine whether the firmware updating file supports the DDI format (or first format). If the component field indicates that the firmware updating file supports the DDI format, which means that the firmware updating file includes the DDI header (or first header) as shown in FIG. 2B, proceed to step S304. If the component field indicates that the firmware updating file does not support the DDI format, which means the firmware updating file does not include the DDI header as shown in FIG. 2A, proceed to step S307.

In this embodiment, if the firmware updating file is in a format including the DDI header (FIG. 2B), then the component field detected in step S303 is the component field in the DDI header. If the firmware updating file is in a format not including the DDI header (FIG. 2A), the component field detected in step S303 is the component field in the ACT header. In addition, it should be noted that the component field includes a reserved bit, and the HPM API 121 determines whether the firmware updating file supports the DDI format according to the reserved bit. Thus, the firmware updating file of the traditional HPM format can utilize the original reserved bit in the component field for the HPM API 121 to determine whether the firmware updating file supports the DDI format and does not need to be reformatted.

In step S304, the DDI API 122 (or second API) may detect the board identifier (board ID) field (or second field) in the firmware updating data in the DDI header to obtain an identifier (i.e., obtain the identifier according to information in the board identifier field). Specifically, the board identifier field may include one (or more) bytes indicating one of multiple identifiers. For example, a byte may be used to indicate one of 128 identifiers. The DDI API 122 may select the corresponding identifier among the 128 identifiers according to the instruction of the byte in the board identifier field. The identifier is used to indicate the firmware component to which the firmware updating file applies. Table 1 shows examples of identifiers in the board identifier field.

TABLE 1

| firmware component | identifier |
|---|---|
| BMC | 0x01 |
| BIOS | 0x02 |
| MB CPLD | 0x06 |
| PSU | 0x07 |
| BP CPLD (2NVME) | 0x20 |
| BP CPLD (24NVME) | 0x21 |
| BP CPLD (12SATA) | 0x22 |
| BP BMC | 0x31 |
| BP CPLD | 0x36 |
| BP PSU | 0x37 |

In step S305, the DDI API 122 may determine whether the firmware updating file is damaged. If the firmware updating file is damaged, the process will be stopped. If the firmware updating file is not damaged, proceed to step S306. Specifically, the DDI API 122 may calculate a hash value corresponding to the firmware updating data in the DDI header, and determine whether the hash value matches a hash support field or a hash length field in the firmware updating data. If the hash value matches the hash support field or the hash length field, the DDI API 122 may determine that the firmware updating file is not damaged. If the hash value does not match the hash support field or the hash length field, the DDI API 122 may determine that the firmware updating file is damaged.

In step S306, the DDI API 122 may load boot data corresponding to the identifier from the firmware updating file according to the identifier indicated by the board identifier field in the DDI header.

In step S307, the HPM API 121 may detect the component field in the ACT header (or second header) to obtain the identifier (i.e., obtain the identifier according to the information in the component field). Specifically, the component field may include a byte indicating one of multiple identifiers. For example, a byte may be used to indicate one of seven identifiers. The HPM API 121 may select the corresponding identifier among the seven identifiers according to the instructions of the component field. The identifier is used to indicate the firmware component to which the firmware updating file applies. That is, in this embodiment, the identifier that the component field (first field) can indicate is less than the identifier that the board identifier field (second field) can indicate.

In step S308, the HPM API 121 may determine whether the firmware updating file is damaged. If the firmware updating file is damaged, the process will be stopped. If the firmware updating file is not damaged, proceed to step S309. Specifically, the HPM API 121 may calculate a hash value corresponding to the firmware updating data in the boot data (not shown in FIG. 2A or FIG. 2B), and determine the hash value and the hash support field or hash length in the firmware updating data matches. If the hash value matches the hash support field or the hash length field, the HPM API 121 may determine that the firmware updating file is not damaged. If the hash value does not match the hash support field or the hash length field, the HPM API 121 may determine that the firmware updating file is damaged.

In step S309, the HPM API 121 may load boot data corresponding to the identifier from the firmware updating file according to the identifier indicated by the component field in the ACT header.

In step S310, the HPM API 121 or the DDI API 122 transmits the boot data to the firmware component corresponding to the identifier through the communication interface 130 to update the firmware component. For example, the HPM API 121 or the DDI API 122 may transmit the boot data to the read-only memory configured to store the firmware component in the external device, thereby updating the firmware component in the read-only memory. Specifically, after completing step S306, the DDI API 122 may transmit the boot data to the firmware component corresponding to the identifier indicated by the DDI header through the communication interface 130 to update the firmware component. On the other hand, after completing step S309, the HPM API 121 may transmit the boot data to the firmware component corresponding to the identifier indicated by the ACT header through the communication interface 130 to update the firmware component.

Figure 4:
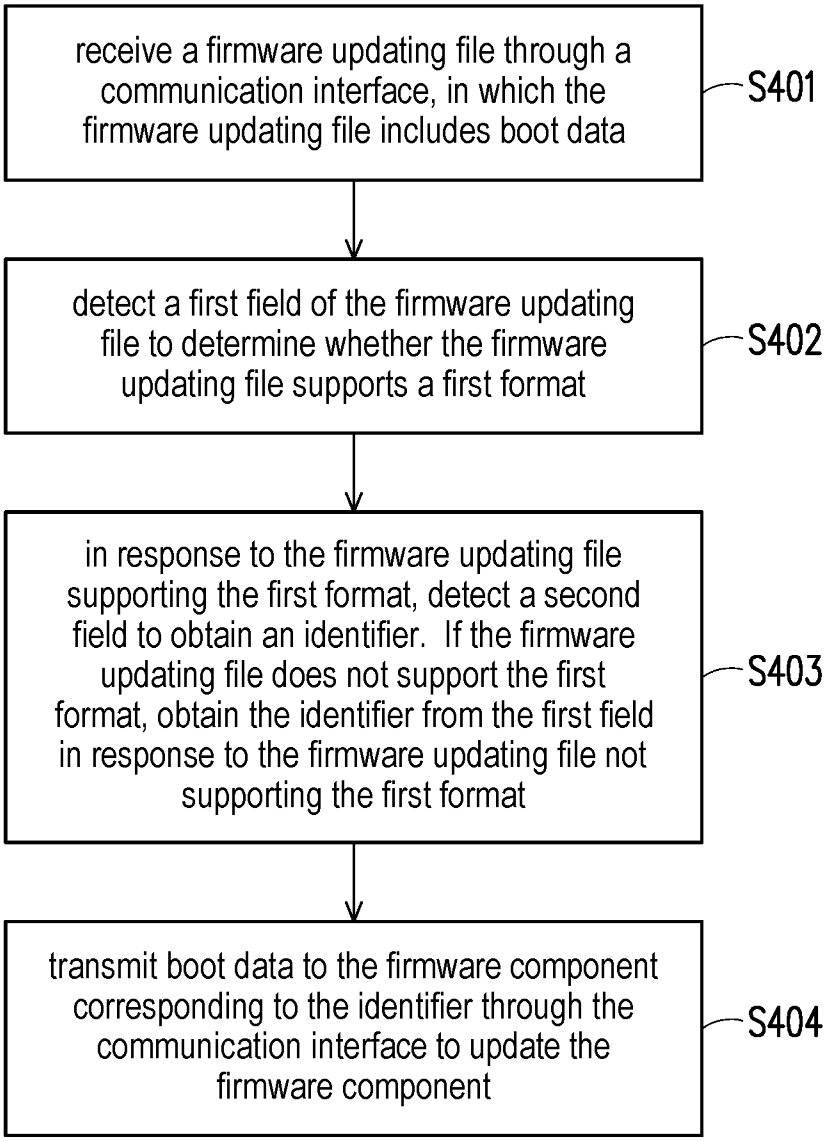
FIG. 4 illustrates a flow chart of a method for updating firmware according to an embodiment of the disclosure.

FIG. 4 illustrates a flow chart of a method for updating firmware according to an embodiment of the disclosure, in which the method may be implemented by the electronic device 100 shown in FIG. 1. In step S401, a firmware updating file is received through a communication interface, in which the firmware updating file includes boot data. In step S402, a first field of the firmware updating file is detected to determine whether the firmware updating file supports a first format. In step S403, in response to the firmware updating file supporting the first format, a second field is detected to obtain an identifier (i.e., the identifier is obtained according to information in the second field). If the firmware updating file does not support the first format, the identifier is obtained from the first field in response to the firmware updating file not supporting the first format (i.e., the identifier is obtained according to information in the first field). In step S404, boot data is transmitted to the firmware component corresponding to the identifier through the communication interface to update the firmware component.

In summary, the electronic device of the disclosure may determine whether the firmware updating file supports the HPM format, and then determine whether the firmware updating file is available. If the firmware updating file is available, the electronic device may further detect the reserved bit of the first field in the firmware updating file to determine whether the firmware updating file includes the DDI header. If the firmware updating file includes the DDI header, the electronic device may select one of more than 8 identifiers according to content of the board identifier field in the DDI header, and update the firmware component to which the firmware updating file applies according to the identifiers. On the other hand, if the firmware updating file does not include the DDI header, the electronic device may select one of up to eight identifiers according to content of the component field in the ACT header, and update the firmware component to which the firmware updating file applies according to the identifiers. Thus, the disclosure may not only cooperate with the firmware updating file of traditional HPM format to select the firmware component to which the firmware updating file applies to update from within 8 types of firmware components, but also cooperate with the firmware updating file including the DDI header to select the firmware component to which the firmware updating file applies to update from more than 8 types of firmware components.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device for updating a firmware, comprising:

a communication interface, adapted to receive a firmware updating file, wherein the firmware updating file comprises boot data;

a storage medium, storing a plurality of modules; and a processor, coupled to the storage medium and the communication interface, adapted to access and execute the modules, wherein the modules comprise:

a first application programming interface, adapted to detect a reserved bit within a first field of the firmware updating file to determine whether the firmware updating file supports a first format according to the reserved bit, wherein a format of the firmware updating file comprises a hardware platform management (HPM) format, and the first field corresponds to a component field in the hardware platform management format; and a second application programming interface, in response to the firmware updating file supporting the first format, adapted to detect a second field to obtain an identifier, wherein obtaining the identifier comprises selecting the identifier from among more than eight identifiers according to a byte in the second field, and the identifier indicates a firmware component to which the firmware updating file applies from more than eight types of firmware components, wherein after obtaining the identifier, the second application programming interface transmits the boot data to the firmware component corresponding to the identifier obtained from the second field through the communication interface to update the firmware component.

2. The electronic device according to claim 1, wherein the firmware updating file further comprises a first header, and the first header comprises the first field and the second field.

3. The electronic device according to claim 1, wherein in response to the firmware updating file not supporting the first format, the first application programming interface obtains the identifier from the first field, wherein after obtaining the identifier, the first application programming interface transmits the boot data to the firmware component corresponding to the identifier through the communication interface to update the firmware component.

4. The electronic device according to claim 3, wherein the firmware updating file further comprises a second header, and the second header comprises the first field.

5. The electronic device according to claim 4, wherein the format of the firmware updating file further comprises the second header corresponds to an action header in the hardware platform management format.

6. The electronic device according to claim 1, wherein the firmware updating file further comprises a third header, wherein the first application programming interface detects a third field in the third header to determine whether the firmware updating file supports a second format, wherein in response to the firmware updating file supporting the second format, the first application programming interface detects the first field to determine whether the firmware updating file supports the first format.

7. The electronic device according to claim 6, wherein the format of the firmware updating file further comprises the third header corresponds to a hardware platform management header in the hardware platform management format.

8. The electronic device according to claim 1, wherein the communication interface supports at least one of a serial peripheral interface and an integrated bus circuit.

9. A method for updating a firmware, comprising:

receiving a firmware updating file through a communication interface, wherein the firmware updating file comprises boot data;

detecting a reserved bit within a first field of the firmware updating file to determine whether the firmware updating file supports a first format according to the reserved bit, wherein a format of the firmware updating file comprises a hardware platform management (HPM) format, and the first field corresponds to a component field in the hardware platform management format;

in response to the firmware updating file supporting the first format, detecting a second field to obtain an identifier, wherein obtaining the identifier comprises selecting the identifier from among more than eight identifiers according to a byte in the second field, and the identifier indicates a firmware component to which the firmware updating file applies from more than eight types of firmware components; and transmitting the boot data to the firmware component corresponding to the identifier obtained from the second field through the communication interface to update the firmware component.

10. The method for updating a firmware according to claim 9, wherein the firmware updating file further comprises a first header, and the first header comprises the first field and the second field.

11. The method for updating a firmware according to claim 9, further comprising in response to the firmware updating file not supporting the first format, obtaining the identifier from the first field.

12. The method for updating a firmware according to claim 11, wherein the firmware updating file further comprises a second header, and the second header comprises the first field.

13. The method for updating a firmware according to claim 12, wherein the format of the firmware updating file further comprises the second header corresponds to an action header in the hardware platform management format.

14. The method for updating a firmware according to claim 9, wherein the firmware updating file further comprises a third header, wherein a first application programming interface detects a third field in the third header to determine whether the firmware updating file supports a second format, wherein in response to the firmware updating file supporting the second format, the first application programming interface detects the first field to determine whether the firmware updating file supports the first format.

15. The method for updating a firmware according to claim 14, wherein the format of the firmware updating file further comprises the third header corresponds to a hardware platform management header in the hardware platform management format.

16. The method for updating a firmware according to claim 9, wherein the communication interface supports at least one of a serial peripheral interface and an integrated bus circuit.

* * * * *